United States Patent [19]

VanAcker

[11] Patent Number: 4,930,696
[45] Date of Patent: Jun. 5, 1990

[54] MOUNTING MEANS FOR VEHICLE AUDIO DEVICE

[75] Inventor: Michael VanAcker, Warren, Mich.

[73] Assignee: Chrysler Corporation, Highland Park, Mich.

[21] Appl. No.: 386,667

[22] Filed: Jul. 31, 1989

[51] Int. Cl.5 .............................................. B60R 11/02
[52] U.S. Cl. ........................... 224/42.45 R; 248/222.4; 248/225.1; 248/551
[58] Field of Search ................. 224/424.5 R, 42.46 R, 224/281, 273; 248/551, 552, 553, 222.4, 224.4, 225.1

[56] References Cited

U.S. PATENT DOCUMENTS 2,486,032 10/1949 Jimenez ................................ 248/552
3,822,049 7/1974 Saunders ........................... 248/225.1
4,047,686 9/1977 Porter ................................. 248/552
4,460,147 7/1984 Macbain ....................... 248/222.4 X Primary Examiner—Renee S. Luebke
Attorney, Agent, or Firm—Edward A. Craig

[57] ABSTRACT

Mounting means are provided for securing the casing of an audio device to the instrument panel structure of a vehicle. Tabs are provided on the casing to engage a bracket provided as part of the instrument panel structure. This is done by means of slots provided in the bracket. A spring arm is provided on the casing to firmly hold the casing in place after the tabs have been inserted into the slots. The casing is fixedly held in place by means of fastening means which are installed from a position in front of the instrument panel.

5 Claims, 2 Drawing Sheets

MOUNTING MEANS FOR VEHICLE AUDIO DEVICE

BACKGROUND OF THE INVENTION

1. Field of the Invention

Mounting means are provided for securing the casing of an audio device to the instrument panel structure of a vehicle.

2. Description of Related Art

Audio devices of various kinds are commonly provided in vehicles. Audio devices normally include a speaker system, antenna and an electronic device. The electronic device may be, for example, a radio receiver, tape cassette player, or compact disk player. The operative mechanisms of such audio electronic equipment are enclosed within a casing. The casing is normally mounted on the instrument panel structure for the convenience of the driver or front seat passenger.

The instrument panel structure of vehicles has become increasingly complex as a result of modern styling techniques and the proliferation of instrumentation and convenience features. Additionally, the underside of the instrument panel area is no longer open but is covered with a bolster to improve crash safety. All of these factors have made it difficult to mount audio devices in the instrument panel structure.

It is desirable that the casing enclosing the audio electronics be installable and removable from a position in front of the instrument panel. It is, however, necessary to mount both the forward and rearward ends of the casing in order to securely mount the casing. Normally, the casing is slid into an opening provided in the instrument panel and into a space in the instrument panel structure which is inaccessible from a position in front of the instrument panel. In accordance with the present invention, cooperative mounting means are provided on the casing and within the instrument panel structure space which permit mounting of the inner end of the casing without the use of additional fasteners. Threaded fasteners are used to secure the exterior end of the casing in place. However, such fasteners may be easily installed from a position in front of the instrument panel.

SUMMARY OF THE INVENTION

Mounting means are provided for securing the casing of an audio device to the instrument panel structure of a vehicle. The casing has an upper surface, and interior face, and an exterior face.

The mounting means includes a plate secured to the casing on the upper surface thereof. The plate has a pair of upwardly extending spaced apart tabs positioned adjacent to the interior face of the casing. Each tab comprises a first upwardly extending portion and a second portion extending from the upper end of the first portion laterally of the casing.

The instrument panel structure includes a bracket portion comprising a first generally horizontally extending wall having a rearward edge. A second upwardly angled wall extends from the rearward edge. The bracket portion includes a pair of longitudinally extending slots spaced apart the same distance as the spacing of the tabs. Each slot includes a first enlarged portion formed in the upwardly angled wall of the bracket portion to permit passage of an entire tab upon insertion of the casing into the instrument panel structure. Each slot includes a second narrow portion formed in the horizontally extending portion of the bracket portion to permit longitudinal passage of the first upwardly extending portion of a tab but not downward passage of the second portion of a tab after the tab has been inserted into the slot.

At least one spring arm extends upwardly from the horizontally extending wall of the plate into pressure contact with the bracket after the casing has been inserted into the instrument panel structure to thereby secure the casing firmly in place.

The plate which is secured to the casing has an upwardly angled portion adjacent the exterior face of the casing. The instrument panel structure has a downwardly angled wall portion positioned to contact the upwardly angled portion of the plate upon insertion of the casing into the instrument panel structure. Fastening means are provided to fixedly secure the upwardly angled portion of the plate to the downwardly angled wall portion of the instrument panel structure to thereby fixedly secure the casing in place.

Preferably, the spring arm is positioned between the slots and is formed from the material of the plate. Two spring arms are desireably provided. The tabs are preferably formed from the material of the plate.

IN THE DRAWINGS

DETAILED DESCRIPTION OF A PREFERRED EMBODIMENT

Referring to the figures, it will be noted that the casing 10 of an audio device is illustrated. The audio device may be, for example, a radio receiver, tape cassette player, compact disk player, or the like. Portions only of the instrument panel structure are illustrated as necessary for an understanding of the invention. It will be appreciated that the instrument panel structure is that commonly used in modern vehicles and includes an exterior instrument panel usually formed of a plastic material, which is mounted over a space in front of the driver. This space contains various panel and bracket structure for mounting of the various components which are provided on the instrument panel. These components consist primarily of instrumentation devices such as odometers, speedometers and various gauges and the like. An opening is provided in the instrument panel for inserting the casing 10 into the space in front of the instrument panel as is standard.

The casing 10 has an upper surface 12, in interior face 14 and an exterior face 16. The interior face 14 is on the end of the casing 10 which is inserted into the instrument panel. The exterior face 16 is that face which is visible to the vehicle driver.

Figure 1:
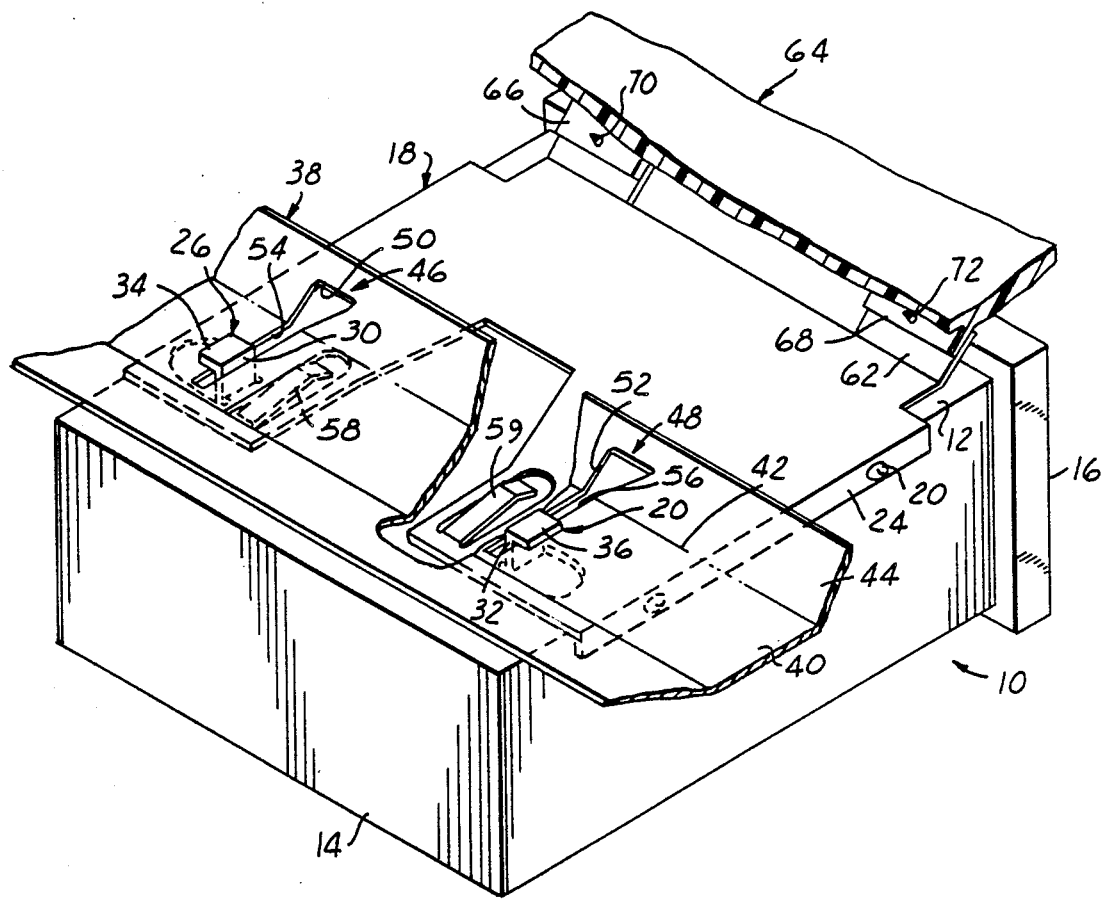
FIG. 1 is a view in perspective of the mounting means for securing the casing of an audio device to the instrument panel structure of a vehicle.
Figure 2:
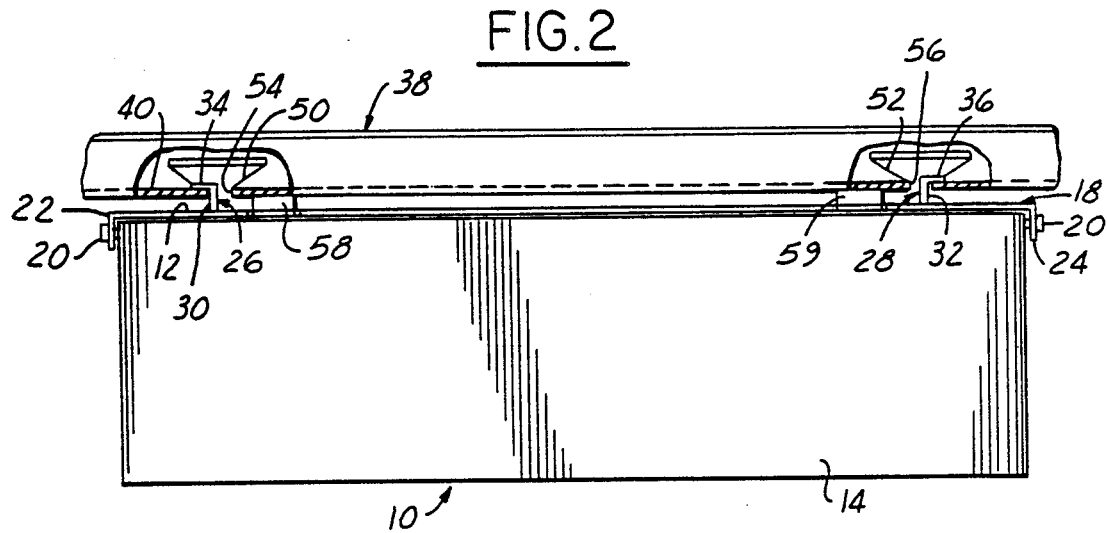
FIG. 2 is a view in elevation of the interior end of the structure shown in FIG. 1, viewed from the left with respect to FIG. 1.
Figure 3:
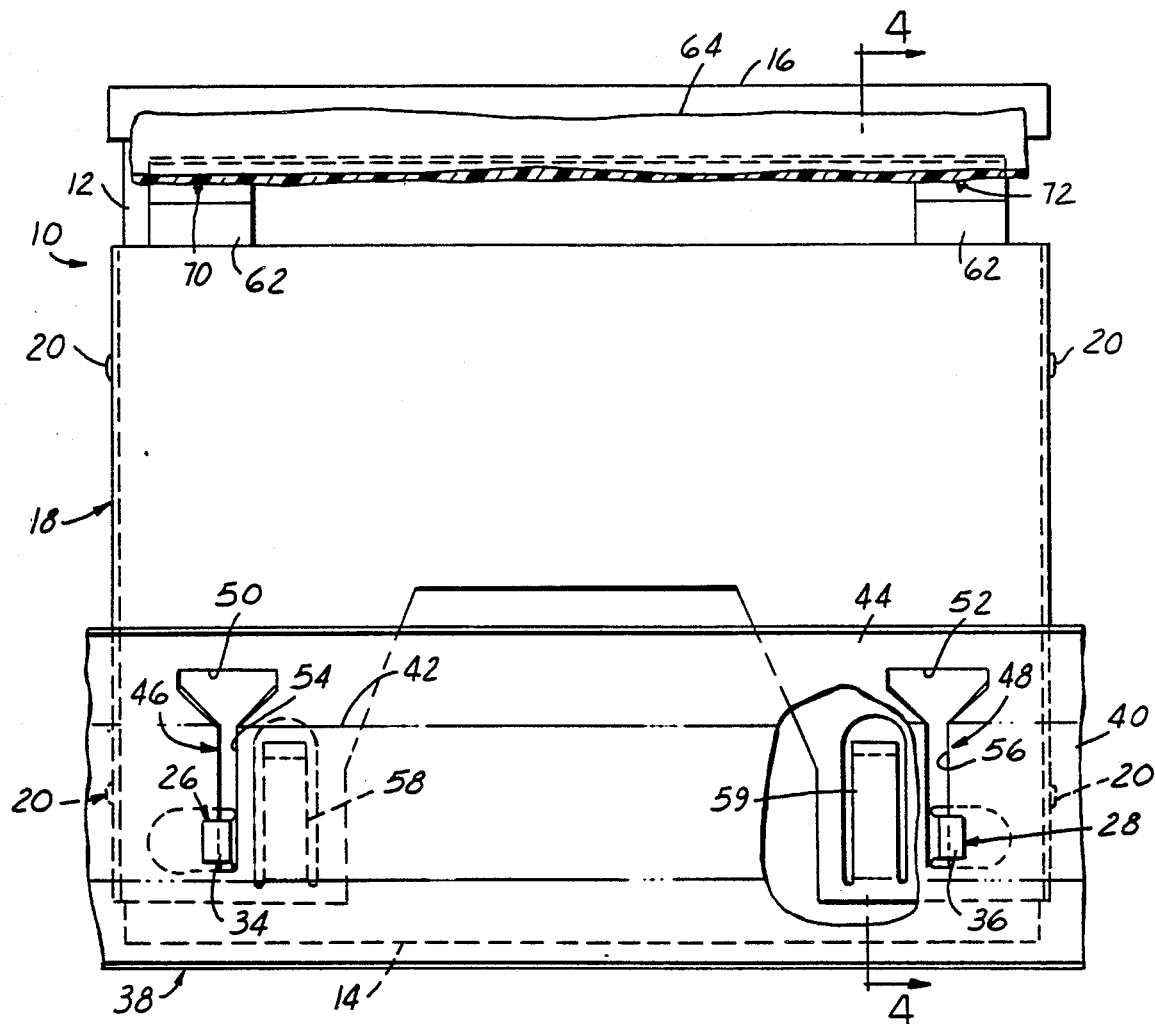
FIG. 3 is a plan view of the structure shown in FIG. 1.
Figure 4:
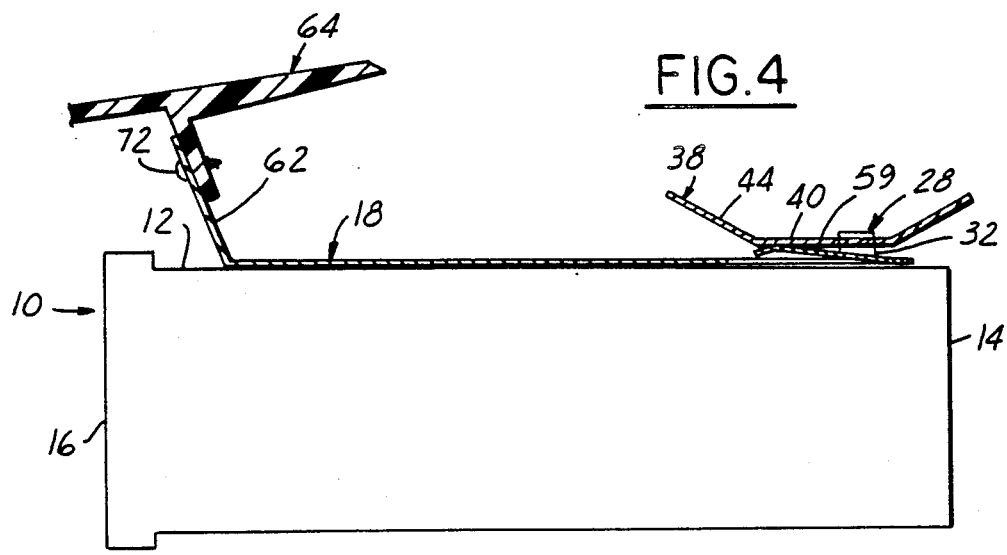
FIG. 4 is a side elevational view of the structure of FIG. 3 with a section being taken through the mounting structure along the line 4—4 looking in the direction of the arrows.

A plate 18 is secured over the upper surface 12 of the casing 10 by means of a plurality of screws 20 which engage downwardly extending flanges 22, 24. As will be noted in FIG. 2, the plate 18 is spaced a slight distance from the casing 10. The reason for this is to prevent vibration hum noise which may result from direct contact of the plate with the casing.

The plate 18 has a pair of upwardly extending spaced apart tabs 26, 28 positioned adjacent to the interior face 14. Each tab comprises a first upwardly extending portion 30, 32 and a second portion 34, 36 extending from the upper end of the first portion laterally of the casing. As illustrated, portions 34, 36 are directed towards the outer side walls of the casing. However, they could also extend in the opposite direction.

The instrument panel structure illustrated includes a bracket 38 which is suitably supported within the space of the instrument panel area. The bracket 38 comprises a first, generally horizontally, extending wall 40 having a rearward edge 42 (the term "rearward" being used with respect to the front and rear of a vehicle). A second, upwardly angled, wall 44 extends from the edge 42. The bracket 38 includes a pair of longitudinally extending slots 46, 48. The slots 46, 48 are spaced apart the same distance as the spacing of the tabs 26, 28 so that they will be in line with the tabs when the casing 10 is inserted. Each slot includes a first enlarged portion 50, 52 formed in the upwardly angled wall 44 of the bracket 38. Enlarged portions 50, 52 are of sufficient size to permit passage of an entire tab 26, 28 upon insertion of the casing 10 into the instrument panel structure. Each slot includes a second narrow portion 54, 56 formed in the horizontally extending wall 40 of the bracket 38 to permit longitudinal passage of the first upwardly extending portions 30, 32 of the tabs. However, the narrow portions 54, 56 will not permit downward passage of the second tab portions 34, 36 after the tabs have been inserted into the slot. Thus, as illustrated in the figures, the portions 34, 36 will come into contact with the horizontal wall 40 of the bracket and support the interior end of the casing 10.

A pair of spring arms 58, 59 extend upwardly from the plate 18 into pressure contact with the lower surface of the bracket wall 40 after the casing has been inserted into the instrument panel structure to thereby secure the casing firmly in place to prevent chatter when the vehicle is driven. The spring arms 58, 59 are positioned between the slots 46, 48 to provide an even distribution of the spring force between the tabs 26, 28 to thereby secure the casing firmly in place.

The plate 18 has upwardly angled portions 62 adjacent the exterior face 16 of the casing defining a wall portion. A portion 64 of the instrument panel is illustrated. The portion 64 includes downwardly angled wall segments 66, 68 which form a wall portion positioned to contact the upwardly angled portions 62 of the plate upon insertion of the casing 10 into the instrument panel structure. Fastening means in the form of a pair of screws 70, 72 are threaded through the portions 62 and wall segments 66, 68 to thereby fixedly secure the casing 18 in place. The screws 70, 72 are mounted from a position in front of the instrument panel to thereby permit the installer to easily mount the entire casing 10 as desired from a convenient location. The installer merely first inserts the casing 10 whereupon it is hung in place by means of the tabs 26, 28. He then installs the screws 70, 72 to complete the mounting procedure. The casing 10 may be easily removed for service by unthreading the screws 70, 72 and pulling it out of the instrument panels structure.

The spring arms 58, 59 are formed from the material of the plate 18 and the tabs 26, 28 are also formed from the material of the plate 18 to thereby provide a low cost structure.

I claim:

1. Mounting means for securing a casing of an audio device to an instrument panel structure of a vehicle, the casing having an upper surface, an interior face, and an exterior face, the mounting means including a plate secured to the casing on the upper surface thereof, the plate having a pair of upwardly extending spaced apart tabs positioned adjacent to the interior face of the casing, each tab comprising a first upwardly extending portion and a second portion extending from an upper end of the first portion laterally of the casing, the instrument panel structure including a bracket comprising a first wall extending generally horizontally and having a rearward edge, a second wall angled upwardly and extending from said rearward edge, the bracket including a pair of longitudinally extending slots spaced apart the same distance as the spacing of the tabs, each slot including a first enlarged portion formed in the upwardly angled wall of the bracket to permit passage of an entire tab upon insertion of the casing into the instrument panel structure, each slot including a second narrow portion formed in the horizontally extending wall of the bracket to permit longitudinal passage of the first upwardly extending portion of the tab but not downward passage of the second portion of the tab after the tab has been inserted into the slot, at least one spring arm extending upwardly from the plate which is secured to the casing to make pressure contact with the bracket after the casing has been inserted into the instrumental panel structure to thereby secure the casing firmly in place, the plate which is secured to the casing having an upwardly angled wall portion adjacent the exterior face of the casing, the instrument panel structure having a downwardly angled wall portion positioned to contact the upwardly angled portion of the plate upon insertion of the casing into the instrumental panel structure, and fastening means to fixedly secure the upwardly angled portion of the plate to the downwardly angled wall portion of the instrumental panel structure to thereby fixedly secure the casing in place.

2. Structure as defined in claim 1, further characterized in that the spring arm is positioned between the slots.

3. Structure as defined in claim 1, further characterized in that the spring arm is formed from the material of the plate which is secured to the casing.

4. Structure as defined in claim 3, further characterized in that two spring arms are provided.

5. Structure as defined in claim 1, further characterized in that the tabs are formed from the material of the plate which is secured to the casing.

* * * * *